(12) United States Patent
Kim

(10) Patent No.: US 11,227,308 B2
(45) Date of Patent: Jan. 18, 2022

(54) CONTROL SERVICE SYSTEM FOR LOCAL DEVICE, USING REFERENCE REGION

(71) Applicant: ALTSOFT, INC., Seoul (KR)

(72) Inventor: Chan Hong Kim, Seoul (KR)

(73) Assignee: ALTSOFT. INC., Seoul (KR)

( * ) Notice: Subject to any disclaimer, the term of this patent is extended or adjusted under 35 U.S.C. 154(b) by 0 days.

(21) Appl. No.: 16/978,145

(22) PCT Filed: May 3, 2019

(86) PCT No.: PCT/KR2019/005373
§ 371 (c)(1),
(2) Date: Sep. 3, 2020

(87) PCT Pub. No.: WO2019/212311
PCT Pub. Date: Nov. 7, 2019

(65) Prior Publication Data
US 2021/0166264 A1  Jun. 3, 2021

(30) Foreign Application Priority Data
May 4, 2018  (KR) .......................... 10-2018-0052109

(51) Int. Cl.
*G06Q 30/02* (2012.01)
(52) U.S. Cl.
CPC ................................ *G06Q 30/0251* (2013.01)
(58) Field of Classification Search
CPC ...................................................... G06Q 30/02
See application file for complete search history.

(56) References Cited

U.S. PATENT DOCUMENTS

| 2008/0089288 | A1* | 4/2008 | Anschutz | ............... | G06Q 30/02 370/331 |
| 2009/0012880 | A1* | 1/2009 | Tortola | ............... | G06Q 30/0264 705/14.61 |
| 2009/0144157 | A1* | 6/2009 | Saracino | ............... | G06Q 30/02 705/14.73 |
| 2009/0319625 | A1* | 12/2009 | Kouhi | ............... | G06Q 30/02 709/206 |

(Continued)

FOREIGN PATENT DOCUMENTS

| KR | 1020110049976 A | 5/2011 |
| KR | 1020120091958 A | 8/2012 |

(Continued)

OTHER PUBLICATIONS

Clinch, S. E. (2013). Supporting user appropriation of public displays (Order No. 10019919). Available from ProQuest Dissertations and Theses Professional. (1774181335). Retrieved from https://dialog.proquest.com/professional/docview/1774181335?accountid=131444 (Year: 2013).*

(Continued)

*Primary Examiner* — Vincent M Cao
(74) *Attorney, Agent, or Firm* — STIP Law Group, LLC

(57) ABSTRACT

A control service system for a local device, using a reference region, is proposed. By receiving a control signal from a user device positioned in the reference region of the local device and controlling the local device, the local device may be controlled by using the user device without installing a separate sensor or registering device.

6 Claims, 5 Drawing Sheets

(56) References Cited

U.S. PATENT DOCUMENTS

| | | | | |
|---|---|---|---|---|
| 2010/0228632 A1* | 9/2010 | Rodriguez | ............ | G06F 3/0425 |
| | | | | 705/14.66 |
| 2015/0169189 A1* | 6/2015 | Want | ...................... | G06Q 30/02 |
| | | | | 715/740 |
| 2017/0278139 A1* | 9/2017 | Vaya | .................. | G06Q 30/0269 |
| 2017/0364956 A1* | 12/2017 | Dhar | .................. | G06Q 30/0269 |
| 2018/0129551 A1* | 5/2018 | Lee | ..................... | G06F 11/0769 |
| 2019/0339925 A1* | 11/2019 | Lorenz | ............... | G06Q 30/0273 |

FOREIGN PATENT DOCUMENTS

| KR | 101324106 B1 | 10/2013 |
|---|---|---|
| KR | 1020140094816 A | 7/2014 |
| KR | 1020140116565 A | 10/2014 |
| KR | 101830127 B1 | 2/2018 |
| KR | 101936178 B1 | 1/2019 |

OTHER PUBLICATIONS

International Search Report of PCT/KR2019/005373, dated Aug. 19, 2019, English translation.

\* cited by examiner

CONTROL SERVICE SYSTEM FOR LOCAL DEVICE, USING REFERENCE REGION

CROSS-REFERENCE TO RELATED APPLICATIONS

This application is the U.S. National Phase under 35 U.S.C. § 371 of International Application No. PCT/KR2019/005373 filed on May 3, 2019, which in turn claims the benefit of Korean Application No. 10-2018-0052109, filed on May 4, 2018, the disclosures of which are incorporated by reference into the present application.

TECHNICAL FIELD

The present invention relates to a control service system for controlling a local device by using a user device and, more particularly, to a control service system for a local device, using a reference region.

BACKGROUND ART

Digital Signage refers to a digital bulletin board that provides various information and advertisements by using digital displays instead of existing analog billboards such as posters, guide marks, and signs. The digital signage is characterized by enabling users to remotely control content all at once through connecting to a network, and having excellent ability to deliver information through attracting great attention, thereby being effective in providing advertisements and content. However, such digital signage simply delivers content that is only intended to be displayed to users or unspecified audiences, and does not consider personal preferences of the viewers of the content, thereby causing a problem in that it is difficult to greatly expect an effect obtained from the provided content.

In order to solve this problem, Korean Patent No. 10-1830127 (invention title: INTERACTION CONTROL METHOD AND SYSTEM FOR DIGITAL SIGNAGE AND RECORDING MEDIUM THEREOF, registration date: Feb. 12, 2018) is disclosed. However, even though applying this technique, users are still in position, being passively exposed to advertisements.

Meanwhile, as the users who are familiar with digital devices and personalized advertisements increase, the users are in a trend of becoming insensitive to the passively exposed advertisement. In addition, the users tend to have a strong desire to use new digital devices, and participate actively in promotional events and the like. In accordance with such a tendency, recently, large screens, sensors, and the like are installed together in areas having a large floating population; and various ways of capturing and displaying users' appearances on a screen or controlling a display to change according to users' motions are utilized, thereby drawing attention of the users. However, such a technique has a limitation in that a high installation cost is required and direct control of a device by a user is impossible.

Meanwhile, regarding a technique for controlling a device by using position information of a user, Korean Patent No. 10-1638582 (invention title: DEVICE CONTROL APPARATUS BASED ON POSITION INFORMATION, registration date: Jul. 5, 2016) and others have been disclosed. However, such a conventional technique is just a technique for controlling personal peripheral devices, and a control service cannot be provided to a plurality of users for devices installed in an open public space.

When the users are allowed to control the devices such as digital signage installed in the public places, an interest of users may be aroused and an advertising effect may be maximized. However, since there is the limitation in that such an effect may not be achieved with the conventional technique as described above, it is necessary to develop a technique to solve this problem.

DISCLOSURE

Technical Problem

The present invention is proposed to solve the above problems of the previously proposed methods, and an objective of the present invention is to provide a control service system for a local device, using a reference region, wherein, by receiving a control signal from a user device positioned in a reference region of a local device and controlling the local device, the control service system is capable of controlling the local device by using the user device without installing a separate sensor or registering the device.

In addition, another objective of the present invention is to provide a control service system for a local device, using a reference region, wherein, by providing a control event to the user device by using the reference region independent of a position of the local device, the control service system is capable of providing the user device with control authority for the local device within the reference region set according to the characteristics of the local device and is capable of providing opportunities to multiple user devices to control the local device by disabling the control event when the user device leaves the reference region.

Technical Solution

In a control service system for a local device, using a reference region, according to characteristics of the present invention for achieving the above objectives, in the control service system that provides a control service for the local device to a user device, the control service system includes: a service provision server that receives a control signal from the user device and controls the local device, wherein, in the service provision server, the service provision server includes: a database module that receives and stores the control authority of the local device to be provided to the user device, and the reference region independent of a position of the local device;

an event provision module that provides a control event of the local device to the user device when a position specified by position information of the user device is included in the reference region; and a control module that controls the local device according to the control signal received from the user device within the control authority when the control event provided to the user device is activated.

Preferably, the database module may receive and store a plurality of reference regions for one local device.

Preferably, in the reference region of the local device, a distance and an area from the local device may be different depending on a scale of the local device.

Preferably, the event provision module may provide the control event of the local device to the user device when there is no active control event for the local device.

Preferably, the event provision module may provide the control event by using an application installed in the user device or a pop-up window, and the control module may receive an activation signal of a selected control event to activate the control event when the control event is selected by the user device.

More preferably, the control module may activate the control event in order in which the activation signal of the provided control event is received when the position specified by the position information of a plurality of user devices is included in the reference region.

Preferably, the control module may deactivate the control event activated for the user device when the position specified by the position information of the user device is outside the reference region.

Preferably, the control module may receive the control signal through the application installed on the user device and provide an installation link of the application when the application is not installed on the user device.

Advantageous Effects

According to the control service system for the local device, using the reference region, proposed in the present invention, the control service system receives a control signal from a user device positioned in a reference region of a local device and controls the local device, whereby the local device may be controlled by using the user device without installing a separate sensor or registering the device.

In addition, according to the present invention, a control event is provided to the user device by using the reference region independent of the position of the local device, whereby the control service system is capable of providing the user device with control authority for the local device within the reference region set according to the characteristics of the local device and is capable of providing opportunities to multiple user devices to control the local device by disabling the control event when the user device leaves the reference region.

DESCRIPTION OF THE REFERENCE NUMERALS IN THE DRAWINGS

Figure 1:
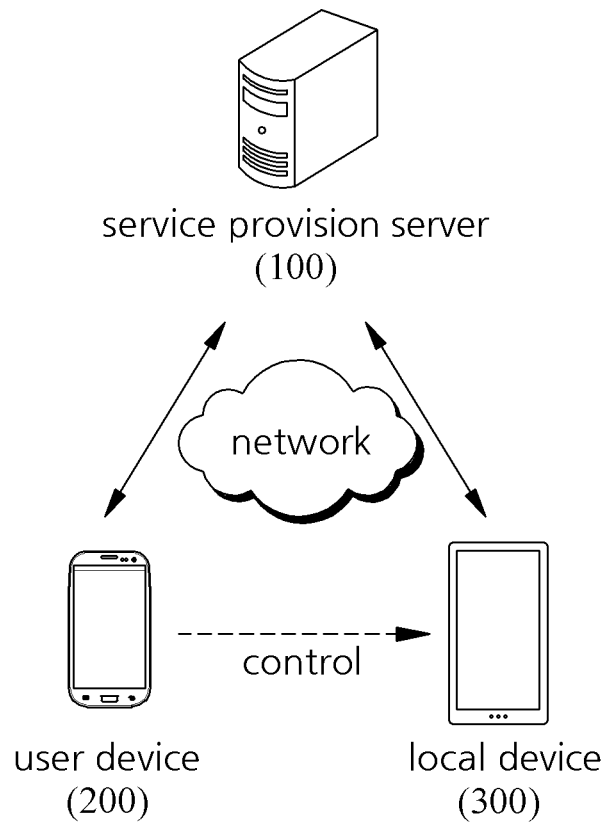
FIG. 1 is a view showing a configuration of a control service system for a local device, using a reference region, according to an exemplary embodiment of the present invention.

X, X1, X2: positions specified by position information of user device
100: service provision server
110: database module
120: event provision module
130: control module
200: user device
300: local device Best Mode Hereinafter, preferred exemplary embodiments will be described in detail with reference to the drawings accompanied in this specification so that those skilled in the art may easily implement the present invention. However, in the following detailed description of the preferred exemplary embodiment of the present invention, it is to be noted that, when the detailed description of a related known function or configuration may obfuscate the subject matter of the present invention, the detailed description thereof will be omitted. In addition, the same reference numerals are used throughout the drawings for parts having similar functions and actions.

In addition, throughout the specification, when a part is said to be "connect(ed)" to another part, an expression such as "connect(ed)" is intended to include not only "direct(ly) connect(ed)" but also "indirect(ly) connect(ed)" having a different component therebetween. In addition, unless the context clearly indicates otherwise, it will be further understood that the terms "comprises", "comprising", "includes", and/or "including" specify the presence of other components, but do not preclude the presence or addition of one or more other components thereof.

FIG. 1 is a view showing a configuration of a control service system for a local device 300, using a reference region, according to an exemplary embodiment of the present invention. As shown in FIG. 1, the control service system for the local device 300, using the reference region, according to the exemplary embodiment of the present invention is a control service system that provides a control service for the local device 300 to a user device 200, and the control service system may be configured to include a service provision server 100 and to further include the user device 200 and the local device 300.

That is, in the present invention, by using a reference region independent of the position of the local device 300, the service provision server 100 controls the local device 300 by receiving the control signal from the user device 200 positioned in the reference region of the local device 300, thereby easily controlling the local device 300 by using the user device 200 without installing a separate sensor or registering the device. Hereinafter, each component of the control service system for the local device 300, using the reference region, according to the exemplary embodiment of the present invention will be described in detail.

The service provision server 100 may receive a control signal from the user device 200 and control the local device 300. Here, the fact that the service provision server 100 controls the local device 300 may mean that the control signal received from the user device 200 is transmitted to the local device 300 through a network, so as to enable the local device 300 to be operated according to the control signal.

The user device 200 may be a device capable of transmitting and receiving data to and from the service provision server 100 through the network. Here, the user device 200 may include a mobile device such as a smartphone, a tablet PC, and a wearable device. However, the user device 200 of the present invention is not limited to the type of the devices described above, and any device that is capable of transmitting and receiving data to and from the service provision server 100 through the network and capable of using position information provided by GPS, a mobile communication network, a local area network, or the like may be included in the user device 200 regardless of its specific type.

The local device 300 is a device capable of transmitting and receiving data to and from the service provision server 100 through the network, and may be a device positioned in the public place. For example, the local device 300 may be a device including a display such as digital signage or a display device installed in the public place, or a device such as a robot that is controllable regardless of whether the display is included.

The present invention enables users to control a local device 300 installed in a public place or positioned in the public place, thereby leading the users to active participation by way of drawing user interest and conducting effective events or advertisements through the participation. In particular, in the present invention, by allowing the user device 200 to control the local device 300 within set control authority, control beyond the control authority is made impossible, thereby providing an opportunity for the user to operate in a safe range. For example, a user may be allowed to control a display of digital signage installed in a public place, but a preset advertisement may be made to be displayed together with the display. In addition, a newly released game may be played on a large display in the public place, so that a game advertisement may be effectively communicated, and an experience event of robot control may be conducted by using the user device 200.

Meanwhile, in the present invention, the network may include: a wired network such as a Local Area Network (LAN), a Wide Area Network (WAN) or a Value Added Network (VAN); or all kinds of wireless networks such as a Mobile Radio Communication Network, a Satellite Network, a Wireless Broadband Internet (WIBRO), and a High Speed Downlink Packet Access (HSDPA).

Figure 2:
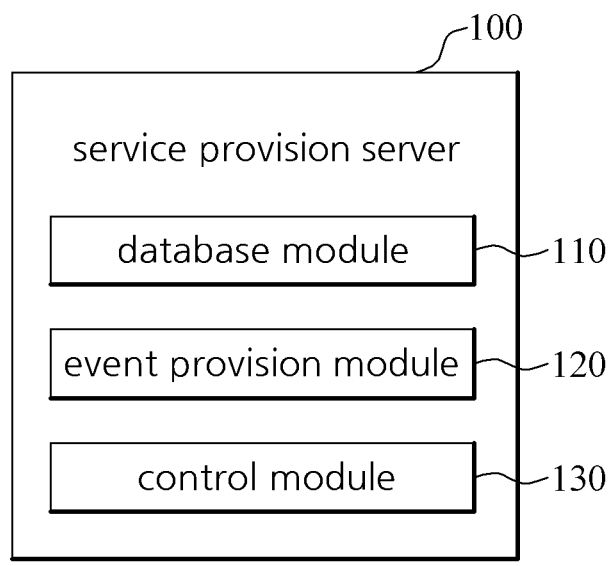
FIG. 2 is a view showing a detailed configuration of a service provision server in the control service system for the local device, using the reference region, according to the exemplary embodiment of the present invention.

FIG. 2 is a view showing a detailed configuration of a service provision server 100 in the control service system for the local device 300, using the reference region, according to the exemplary embodiment of the present invention. As shown in FIG. 2, the service provision server 100 of the control service system for the local device 300, using the reference region, according to the exemplary embodiment of the present invention may be configured to further include a database module 110, an event provision module 120, and a control module 130.

The database module 110 may receive and store a reference region independent of the position of the local device 300 as well as control authority for the local device 300 to be provided to the user device 200. More specifically, the database module 110 may serve to store the control authority and the reference region for the local device 300 received from an administrator of the local device 300. Here, the control authority may indicate a level at which the user is able to control the local device 300. For example, the control authority may be set such as to include control of an image and sound displayed on a display of the digital signage, but to be unable to control of the displayed text, etc.

In addition, the reference region of the local device 300 may be set through an administrator device (not shown) of the local device 300, and may be independent of a physical position of the actual local device 300. The reference region of the local device 300 may or may not include the local device 300, and may be set in a region far from the local device 300. That is, even when the local device 300 is positioned in an "A" region, the reference region of the local device 300 may be set to be a "B" region.

Figure 3:
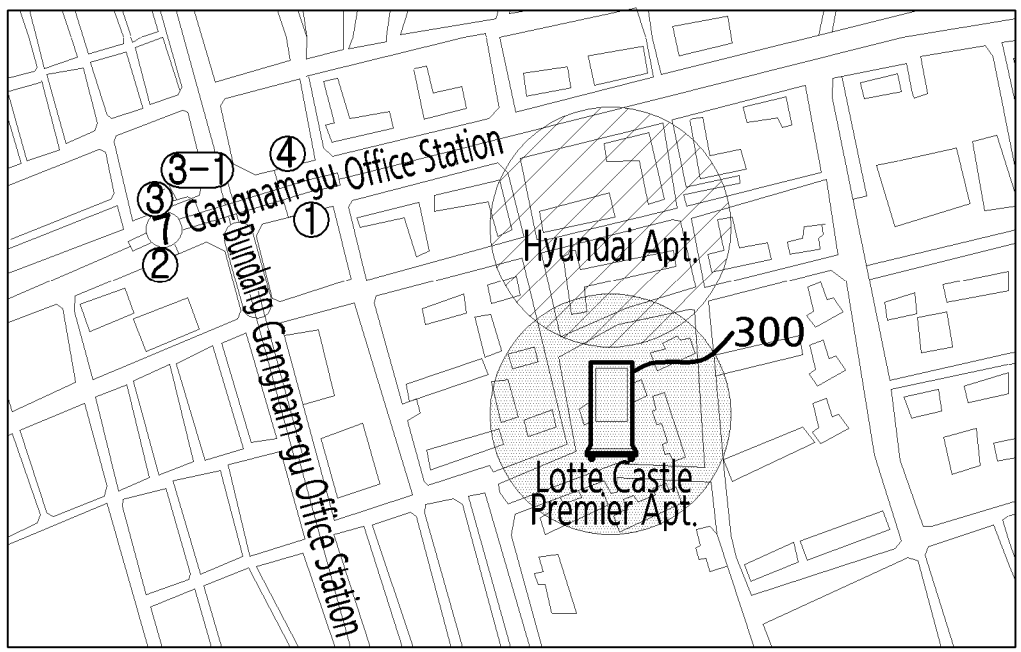
FIG. 3 is a view showing, for example, a screen for receiving a selection of a reference region of the local device in the control service system for the local device, using the reference region, according to the exemplary embodiment of the present invention.

FIG. 3 is a view showing, for example, a screen for receiving a selection of a reference region of the local device 300 in the control service system for the local device 300, using the reference region, according to the exemplary embodiment of the present invention. As shown in FIG. 3, in the control service system for the local device 300, using the reference region, according to the exemplary embodiment of the present invention, the service provision server 100 may receive the reference region of the local device 300 on the map from the administrator device of the local device 300. At this time, a position of the local device 300 may be displayed to make the position a reference. For example, such as a sky blue circle in FIG. 3, the reference region of a local device 300 may include the local device 300, and such as a pink circle in FIG. 3, a reference region of the local device 300 may not include the local device 300. Depending on the exemplary embodiment, the local device 300 may be set to be positioned on a boundary of the reference region.

In addition, the database module 110 may receive and store a plurality of reference regions for a single local device 300. Since the reference region of the local device 300 is independent of the physical position of the local device 300 and may be independently set in the plurality of regions, an effective reference region may be set according to the size, the position, or the like of the local device 300. In particular, in the reference region of the local device 300, a distance and an area from the local device 300 may be different depending on a scale of the local device 300.

Figure 4:
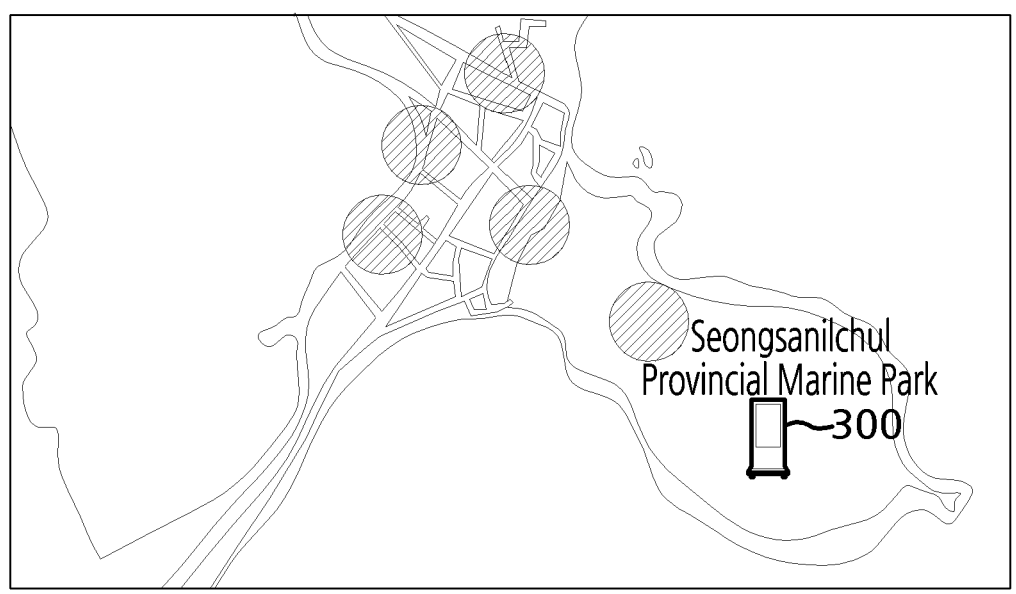
FIG. 4 is a view showing, for example, a screen for receiving a selection of a plurality of reference regions in the control service system for the local device, using the reference region, according to the exemplary embodiment of the present invention.

FIG. 4 is a view showing, for example, a screen for receiving a selection of a plurality of reference regions in the control service system for the local device 300, using the reference region, according to the exemplary embodiment of the present invention. As shown in FIG. 4, in the control service system for the local device 300, using the reference region, according to the exemplary embodiment of the present invention, the service provision server 100 may receive the plurality of reference regions for a single local device 300. As shown in the example illustrated in FIG. 4, when the local device 300 installed in Seongsan Ilchulbong is a large display device, the plurality of reference regions such as the pink circle is set near Seongsan Ilchulbong, so that the local device 300 may be controlled while users climb Seongsan Ilchulbong or the local device 300 may be controlled depending on an angle looking at the local device 300 installed in Seongsan Ilchulbong.

However, since the reference region of the local device 300 is independent of the physical position of the local device 300, the reference region of the local device 300 must not necessarily be a region in which the local device 300 is visually identifiable. In the example as shown in FIG. 4, the reference region of the local device 300 installed in Seongsan Ilchulbong may be set in downtown Seoul or the like.

Meanwhile, the area of the reference region may be different depending on the size of the local device 300, wherein the larger the size of the local device 300 is, the wider the area of the reference region may be. Alternatively, the area of the reference region may be determined based on a fee, an advertising expenses, or the like, and may also be independently determined by the local device 300 or the service provision server 100 using popularity of an event proceeding through the local device 300. For example, when the popularity of a local device 300 A is higher than the popularity of a local device 300 B, the area of the reference region of the local device 300 A may be determined to be wider than the area of the reference region of the local device 300 B. At this time, the local device 300 or the popularity of the event proceeding through the local device 300 may be determined by the number of users who have used or experienced the corresponding local device 300 or the event. However, the area of the reference region is not only determined by the above-described exemplary embodiment, but may also be determined by various methods.

In addition, the reference region of the local device 300 may be a polygonal shape or a circular shape. That is, the reference region of the local device 300 may have various shapes, and each reference region may have an area having a shape different from each other. In the control service system for the local device 300, using the reference region, according to the exemplary embodiment of the present invention, since the control authority of the local device 300 is given to the user device 200 positioned in the reference region, whether or not the user device 200 is controlled may also vary depending on the shape of the reference region. That is, when the reference region is set to a shape including a specific position, although the area of the reference region is not wide, the user device 200 may be given control authority of the local device 300 at the corresponding specific position. Therefore, rather than simply setting the area of the reference region wide without considering the position, the shape of the reference region is set to be polygonal or circular as necessary, whereby the administrator of the local device 300 may provide the control authority of the local device 300 more efficiently to the users at a specific position.

When the position specified by position information of the user device 200 is included in the reference region, the event provision module 120 may provide a control event of the local device 300 to the user device 200. Here, the control event is for interworking the user device 200 and the local device 300, wherein, when the control event is activated, the local device 300 may be controlled by the user device 200; and when the control event is deactivated, the local device 300 may not be controlled by the corresponding user device 200.

Figure 5:
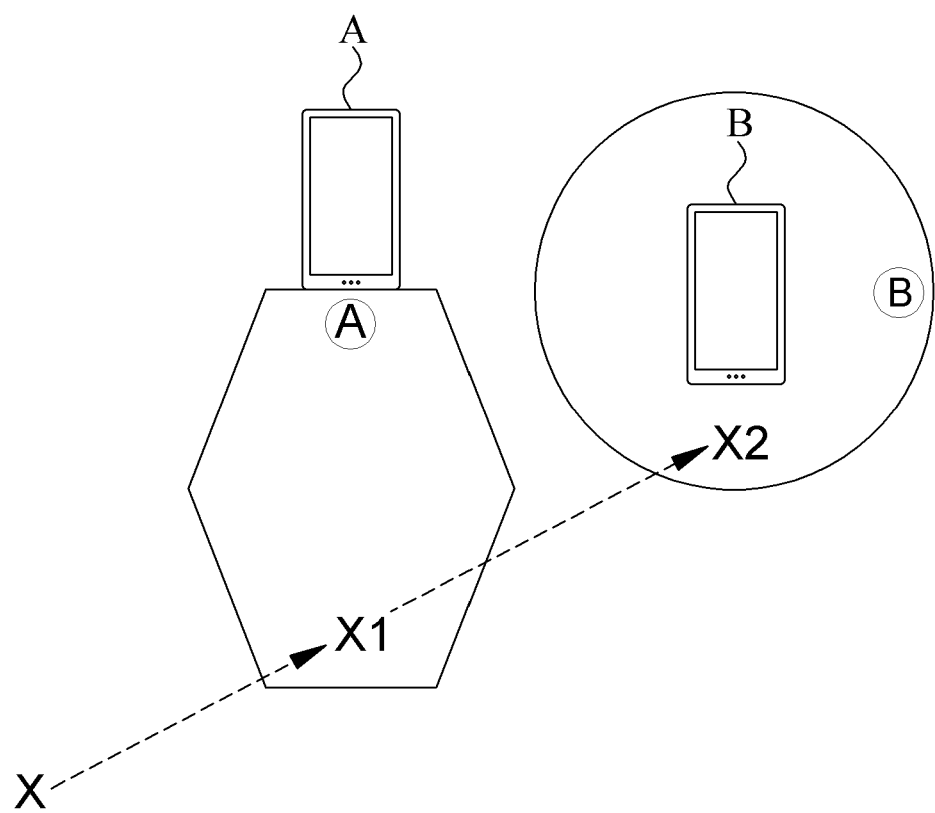
FIG. 5 is a view showing, for example, a change depending on a position movement of a user device in the control service system for the local device, using the reference region, according to the exemplary embodiment of the present invention.

FIG. 5 is a view showing, for example, a change according to a position movement of the user device 200 in the control service system for the local device 300, using the reference region, according to the exemplary embodiment of the present invention. As shown in FIG. 5, in the control service system for the local device 300, using the reference region, according to the exemplary embodiment of the present invention, as the position specified by the position information of the user device 200 changes from X to X1, the user enters the reference region A of the local device 300 A, and the event provision module 120 may provide a control event for the local device 300 A to the user device 200 within the reference region A. When the position specified by the position information of the user device 200 changes from X1 to X2, the user device leaves the reference region A, so that the control event for the local device 300 A is deactivated. When the user device enters the reference region B, the event provision module 120 may provide a control event for the local device 300 B to the user device 200.

Meanwhile, when there is no control event activated for the local device 300, the event provision module 120 may provide a control event of the local device 300 to the user device 200. That is, when an activated control event for the local device 300 exists, the corresponding local device 300 is in a state of being already controlled by another user device 200, so that the event provision module 120 may not provide the control event to a user device 200 newly entered the reference region. In the example as shown in FIG. 5, when another user device 200 is positioned in the reference region A to activate the control event and control the local device 300 A, a control event for the local device 300 A may not be provided to the user device 200 positioned at X1.

In addition, the event provision module 120 may provide the control event through an application installed in the user device 200 or a pop-up window. Here, the application installed on the user device 200 may be an application for receiving advertisement or event information by utilizing the position information, but when the control event of the present invention may be provided, regardless of a specific function or form, the application installed on the user device may be able to act as an application of the present invention.

Figure 6A:
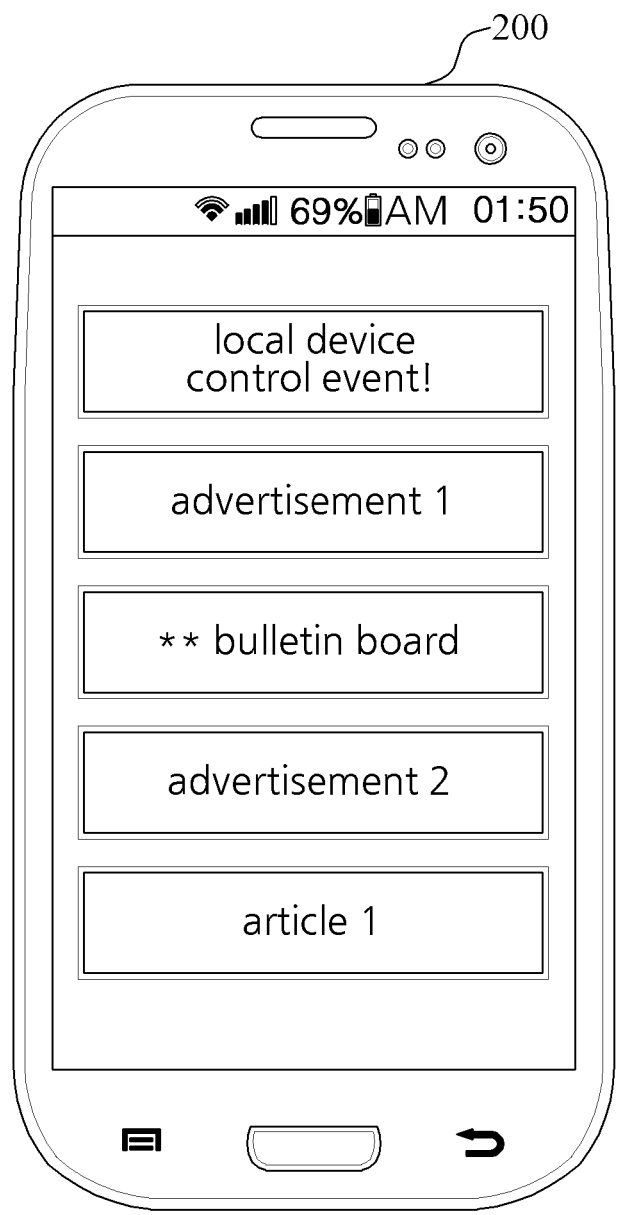
FIGS. 6A and 6B are views showing, for example, a user device provided with a control event in the control service system for the local device, using the reference region, according to the exemplary embodiment of the present invention.
Figure 6B:

FIGS. 6A and 6B are views showing, for example, a user device 200 provided with a control event in the control service system for the local device 300, using the reference region, according to the exemplary embodiment of the present invention. In the control service system for the local device 300, using the reference region, according to the exemplary embodiment of the present invention, the event provision module 120 provides a control event by using an application as shown in FIG. 6A, or may provide the control event by a pop-up window as shown in FIG. 6B.

When the control event provided to the user device 200 is activated, the control module 130 may control the local device 300 according to a control signal received from the user device 200 within the control authority. More specifically, when a control event is selected from the user device 200, the control module 130 may activate the control event by receiving an activation signal of the selected control event. That is, when the user selects and activates a control event by clicking or touching "Local device 300 control event!" in FIG. 6A or by clicking or touching "Go to control event" menu in FIG. 6B, the user device 200 may be able to control the local device 300.

In addition, when the position specified by the position information of the plurality of user devices 200 is included in the reference region, the control module 130 may activate the control events in order in which activation signals of the provided control events are received. That is, in the case where a plurality of users enter a reference region of a local device 300, control authority of the corresponding local device 300 may be given to a user who first inputs an activation signal.

When the control event for the local device 300 is activated, the user device 200 may control the local device 300 within the control authority stored in the database module 110. In this time, the control signal may be a signal for controlling any one object selected from a group including a display of the local device 300 and a game played by the local device 300. For example, the user device 200 may select or directly input an image, picture, text, and the like to be output on a display screen of the local device 300, and is also input images photographed by using a camera provided in the user device 200. In addition, a game played by the local device 300 may be played by means of using the user device 200 as a controller. Depending on the exemplary embodiment, the local device 300 such as a robot may also be operated through inputting a control signal thereto by the user device 200. However, in a range outside the control authority set in advance by the administrator of the local device 300, the control by the user device 200 may not be possible.

In addition, the control module 130 receives a control signal through an application installed in the user device 200, and may provide an installation link of the application when the application is not installed in the user device 200. That is, the installation of the application on the user device 200 is guided, whereby smooth input of the control signal and control of the local device 300 may be made possible.

Meanwhile, when the position specified by the position information of the user device 200 is outside the reference region, the control module 130 may deactivate the control event activated for the user device 200. That is, it is possible to enable control of the local device 300 only when the user is positioned in the reference region, and to disable the control of the local device 300 when the user leaves the reference region. When the control event activated in the user device 200 is deactivated, the event provision module 120 provides a control event to other user devices 200 in the reference region, thereby providing an opportunity to various users to control the local device 300.

According to the control service system for the local device 300, using the reference region, proposed in the present invention, by receiving the control signal from the user device 200 positioned in the reference region of the local device 300 to control the local device 300, the local device 300 may be controlled by using the user device 200 without installing the separate sensor or registering the device. In addition, according to the present invention, by providing a control event to the user device 200 by using a reference region independent of a position of the local device 300 within the reference region set according to the characteristics of the local device 300, the control authority for the local device 300 may be provided to the user device 200, and when the user device 200 leaves the reference region, the control event is deactivated, so that it is possible to temporarily control the local device 300.

The present invention described above can be modified or applied in various ways by those skilled in the art to which the present invention pertains. The scope of the technical idea according to the present invention should be defined by the following claims.

The invention claimed is:

1. A control service system for a local device (300), using a reference region, which provides a control service for the local device (300) to a user device (200), the control service system comprising:

a service provision server (100) that receives a control signal from the user device (200) and controls the local device (300), wherein the service provision server (100) comprises:

a database module (110) that receives and stores a control authority of the local device (300) to be provided to the user device (200), and the reference region independent of a position of the local device (300);

an event provision module (120) that provides a control event of the local device (300) to the user device (200) when a position specified by position information of the user device (200) is included in the reference region; and a control module (130) that controls the local device (300) according to the control signal received from the user device (200) within the control authority when the control event provided to the user device (200) is activated, wherein the event provision module (120) provides the control event by using an application installed in the user device (200) or a pop-up window, the control module (130) receives an activation signal of a selected control event to activate the control event when the control event is selected by the user device (200), and the control module (130) activates the control event in order in which the activation signal of the provided control event is received when the position specified by the position information of a plurality of user devices (200) is included in the reference region.

2. The control service system of claim 1, wherein the database module (110) receives and stores a plurality of reference regions for one local device (300).

3. The control service system of claim 1, wherein, in the reference region of the local device (300), a distance and an area from the local device (300) is different depending on a scale of the local device (300).

4. The control service system of claim 1, wherein the event provision module (120) provides the control event of the local device (300) to the user device (200) when there is no active control event for the local device (300).

5. The control service system of claim 1, wherein the control module (130) deactivates the control event activated for the user device (200) when the position specified by the position information of the user device (200) is outside the reference region.

6. The control service system of claim 1, wherein the control module (130) receives the control signal through the application installed on the user device (200) and provides an installation link of the application when the application is not installed on the user device (200).

* * * * *